United States Patent
Auer et al.

(10) Patent No.: US 9,303,128 B2
(45) Date of Patent: Apr. 5, 2016

(54) METHOD FOR GRANULATING PARTICLE-CONTAINING MATERIAL OBTAINED FROM INDUSTRIAL PROCESSES, THE GRANULATE THUS PRODUCED, AND USE THEREOF

(71) Applicant: SACHTLEBEN PIGMENT GMBH, Krefeld (DE)

(72) Inventors: Gerhard Auer, Krefeld (DE); Horst Guennel, Kempen (DE); Martin Offermann, Moers (DE); Jochen Winkler, Kerken (DE)

(73) Assignee: SACHTLEBEN PIGMENT GMBH, Krefeld (DE)

( * ) Notice: Subject to any disclaimer, the term of this patent is extended or adjusted under 35 U.S.C. 154(b) by 23 days.

(21) Appl. No.: 14/385,171

(22) PCT Filed: Mar. 15, 2013

(86) PCT No.: PCT/DE2013/100104
§ 371 (c)(1),
(2) Date: Sep. 15, 2014

(87) PCT Pub. No.: WO2013/135239
PCT Pub. Date: Sep. 19, 2013

(65) Prior Publication Data
US 2015/0044468 A1   Feb. 12, 2015

(30) Foreign Application Priority Data

Mar. 15, 2012  (DE) .................. 10 2012 102 178

(51) Int. Cl.
| | | |
|---|---|---|
| C08J 3/12 | (2006.01) | |
| C22B 7/04 | (2006.01) | |
| C09C 3/04 | (2006.01) | |
| C09C 1/24 | (2006.01) | |
| C09C 1/36 | (2006.01) | |
| C08K 3/08 | (2006.01) | |
| C08K 3/22 | (2006.01) | |

(52) U.S. Cl.
CPC ... *C08J 3/12* (2013.01); *C08K 3/08* (2013.01); *C08K 3/22* (2013.01); *C09C 1/24* (2013.01); *C09C 1/3638* (2013.01); *C09C 3/045* (2013.01); *C22B 7/04* (2013.01); *C01P 2006/10* (2013.01); *C01P 2006/82* (2013.01); *C08J 2333/26* (2013.01); *C08K 2003/0881* (2013.01); *C08K 2003/2241* (2013.01); *C08K 2003/2265* (2013.01); *Y02P 10/212* (2015.11); *Y10T 428/2982* (2015.01)

(58) Field of Classification Search
CPC .......... C08J 3/12; C08J 2333/26; C22B 7/04; C09C 3/045; C09C 1/24; C09C 1/3638; C08K 3/08; C08K 3/22; Y10T 428/2982; Y02P 10/212

USPC ......................................... 428/402
See application file for complete search history.

(56) References Cited

U.S. PATENT DOCUMENTS

| | | | |
|---|---|---|---|
| 4,076,663 | A | 2/1978 | Masuda et al. |
| 4,131,576 | A | 12/1978 | Iovine et al. |
| 4,179,367 | A | 12/1979 | Barthell et al. |
| 4,286,082 | A | 8/1981 | Tsubakimoto et al. |
| 4,340,706 | A | 7/1982 | Obayashi et al. |
| 5,409,771 | A | 4/1995 | Dahmen et al. |
| 6,514,418 | B1 | 2/2003 | Bartscherer |
| 2005/0181200 | A1 | 8/2005 | Mertens et al. |
| 2006/0089611 | A1 | 4/2006 | Herfert et al. |
| 2009/0022603 | A1 | 1/2009 | Feise et al. |
| 2009/0093665 | A1 | 4/2009 | Ross et al. |
| 2009/0163365 | A1 | 6/2009 | Bentlage et al. |
| 2010/0083719 | A1 | 4/2010 | Peppmoller et al. |
| 2010/0275664 | A1 | 11/2010 | Windhoevel |
| 2012/0001122 | A1 | 1/2012 | Wattebled et al. |
| 2012/0313038 | A1 | 12/2012 | Laros et al. |

FOREIGN PATENT DOCUMENTS

| | | | |
|---|---|---|---|
| DE | 27 06 135 | A1 | 8/1978 |
| DE | 28 40 010 | A1 | 6/1979 |
| DE | 37 13 601 | A1 | 11/1988 |
| DE | 40 20 780 | C1 | 8/1991 |
| DE | 295 16 675 | U1 | 2/1996 |
| DE | 197 04 201 | A1 | 10/1997 |
| DE | 199 00 187 | C1 | 6/2000 |
| DE | 101 30 427 | A1 | 3/2003 |
| DE | 101 61 496 | A1 | 6/2003 |
| DE | 20 2005 020 566 | U1 | 4/2006 |
| DE | 10 2005 021 221 | A1 | 11/2006 |
| DE | 60 2004 002 202 | T2 | 1/2007 |
| DE | 20 2006 020 295 | U1 | 2/2008 |

(Continued)

OTHER PUBLICATIONS

R. Dhodapkar et al.: "Removal of basic dyes from aqueous medium using a novel polymer", Bioresource Technology, vol. 97, pp. 877-885 (2006).

R. Dhodapkar et al.: "Adsorption of cationic dyes on Jalshakti®, super absorbent polymer and photocatalytic regeneration of the adsorbent", Reactive & Functional Polymers, vol. 67, pp. 540-548 (2007).

(Continued)

*Primary Examiner* — Leszek Kiliman
(74) *Attorney, Agent, or Firm* — Norman B. Thot

(57) ABSTRACT

A method for granulating a particle-containing material from an industrial process includes mixing the particle-containing material in the presence of water with a material that consists of or comprises a water-absorbing and swellable organic polymer compound which is insoluble in water so as to obtain granulates.

18 Claims, No Drawings

(56) References Cited

FOREIGN PATENT DOCUMENTS

| | | | |
|---|---|---|---|
| DE | 20 2007 016 362 U1 | | 3/2009 |
| DE | 10 2009 016 404 A1 | | 10/2010 |
| DE | 102010019375 | * | 11/2010 |
| DE | 10 2009 034 137 A1 | | 1/2011 |
| DE | 20 2011 002 784 U1 | | 4/2011 |
| DE | 20 2011 003 679 U1 | | 6/2011 |
| DE | 10 2010 019 375 A1 | | 11/2011 |
| EP | 0 388 108 A2 | | 9/1990 |
| EP | 0 733 596 A1 | | 9/1996 |
| EP | 2 208 767 A2 | | 7/2010 |
| JP | 7-246396 | | 9/1995 |
| WO | WO03/051963 | * | 6/2003 |
| WO | WO 03/051963 A1 | | 6/2003 |
| WO | WO 2006/119828 A1 | | 11/2006 |
| WO | WO 2007/104676 A1 | | 9/2007 |
| WO | WO 2011/097357 A1 | | 8/2011 |
| WO | WO2007/104676 | * | 11/2011 |

OTHER PUBLICATIONS

Frank: "Ullmann's Encyclopedia of Industrial Chemistry", $6^{th}$ Edition, vol. 35, pp. 73-93 (2003).

EDANA: "EDANA Recommended Test Methods", European Disposables and Nonwovens Association, pp. 1-368 (2002).

DIN EN ISO 787-11: "Allgemeine Prüfverfahren für Pigmente und Füllstoffe, Teil 11: Bestimmung des Stampfvolumens und der Stampfdichte", English Translation of pp. 1-6 (1995).

* cited by examiner

METHOD FOR GRANULATING PARTICLE-CONTAINING MATERIAL OBTAINED FROM INDUSTRIAL PROCESSES, THE GRANULATE THUS PRODUCED, AND USE THEREOF

CROSS REFERENCE TO PRIOR APPLICATIONS

This application is a U.S. National Phase application under 35 U.S.C. §371 of International Application No. PCT/DE2013/100104, filed on Mar. 15, 2013 and which claims benefit to German Patent Application No. 10 2012 102 178.3, filed on Mar. 15, 2012. The International Application was published in German on Sep. 19, 2013 as WO 2013/135239 A1 under PCT Article 21(2).

FIELD

The present invention relates to a method for granulating particulate material from industrial processes. More precisely, the invention pertains to a method for granulating particulate material from industrial process products or process residues such as suspensions, sludges, filter cakes, pastes and moist solids, wherein these materials are mixed with moisture-absorbing organic polymeric materials, preferably superabsorbents and/or hydrogels. In a further embodiment of the method of the invention, a method is provided for granulating powder or dust from industrial processes, in which it is mixed with said moisture-absorbing organic polymeric materials, preferably superabsorbents and/or hydrogels, as well as water or aqueous substances. The granulates obtained in this manner may be further treated in a method for drying the granulates obtained by contact with a gaseous medium or by supplying thermal energy. The invention further pertains to granulates which can be obtained using the method described, and the use thereof.

BACKGROUND

Moist materials such as, for example, suspensions, sludges, filter cakes, pastes and moist solids as well as salts containing crystal water can occasionally be difficult to handle. In this regard, the poor storage and transport properties of moist materials are a particular problem. Particularly with finely divided materials, removing the moisture is often only accomplished with difficulty. Because of the moisture and occasional thixotropic behavior of such materials, caking or adhesion often occurs during transport, storage or processing.

Under high mechanical loads such as, for example during pulverizing/drying, moreover, problems with abrasion often arise. In addition, problems frequently arise linked to dust formation during drying.

Problems with handling moist materials which are recognized in the prior art are as follows:
- insufficient reduction in the moisture content: mechanical dewatering results in moist materials which often have only a 20% to 50% by weight dry matter content,
- the moist materials are not easy to handle, and in particular have an annoying tendency to cake and stick upon storage and transport, as well as a tendency towards thixotropy,
- larger particles, for example fragments of a filter cake from a filter press, often exhibit a moisture gradient within the particle: the particle interior is still wet, while the exterior is dusty,
- in conventional drying methods, removing dust from the streams of gas employed for drying is expensive,
- often, transport or drying causes increased abrasion.

The problems with handling pulverulent or dusty materials are generally known and are essentially unwanted dust formation in open systems and poor conveying and metering characteristics during transport.

SUMMARY

An aspect of the present invention is to provide better methods for improving the handling properties of pulverulent or dusty materials and in particular moist materials as well.

In an embodiment, the present invention provides a method for granulating a particle-containing material from an industrial process which includes mixing the particle-containing material in the presence of water with a material that consists of or comprises a water-absorbing and swellable organic polymer compound which is insoluble in water so as to obtain granulates.

DETAILED DESCRIPTION

The method of the invention on the one hand proposes the granulation of moist materials, wherein the moist materials are mixed with water-absorbing, swellable organic polymeric materials, preferably superabsorbents and/or hydrogels and are then transformed into granulates with good storage and/or transport properties, in particular good flow behavior.

Furthermore, the invention proposes the granulation of powder or dust in which it is mixed with water-insoluble, water-absorbing swellable organic polymeric materials such as superabsorbents and/or hydrogels, as well as water or aqueous substances, wherein granulates are formed upon mixing. Preferably, mixing is carried out first followed by the addition of water.

In more detail, the present invention is directed towards a method for granulating particulate material from industrial processes, wherein the particulate material is mixed, in the presence of water, with a material which contains or consists of a quantity of water-absorbing, water-insoluble and swellable organic polymeric material. In accordance with the invention, depending on the mode of manufacture, the water or the moisture may if appropriate also contain other substances such as salts and solvents. However, in order not to have a deleterious effect on the swelling capacity, the quantity thereof should be kept as small as possible.

In this manner, the water can be present in the form of moisture which clings to the particulate material and/or can be added to the particulate material and/or the mixture of particulate material with the material which contains a quantity of the organic polymeric material. In this manner, in the method of the invention it is possible to use the particulate material in the moist form and/or in the dry form, and also as a mixture of different particulate materials in the moist or dry form. In accordance with the invention, data regarding the moisture content of the material encompasses the moisture clinging to the material and also bound crystal water which is released under the moisture content determination conditions (105° C.). In this manner, in accordance with the invention, the particulate material can have a moisture content of more than 5% by weight, preferably 10% to 90% by weight, particularly preferably 20-85% by weight with respect to the weight of the particulate material. In a further embodiment, the invention therefore proposes that, before being supplied to the mixing step, none of the components of the mixture undergoes a heat treatment, in particular drying using heat.

Optionally, the granulates are then dried, wherein the small amount of dust formation upon drying of the granulates is particularly advantageous. The granulates dry completely in thin layers at ambient temperature within a few hours without the need for strong gas flows!

Initial examples of the treatment of moist materials which may be cited are as follows: pigments (including $TiO_2$, iron oxide), titanium hydrate, technical iron oxide from thermal decomposition of metal sulphates (combustion) after flushing out the soluble salts, preparations containing digestion residues from the manufacture or $TiO_2$, precipitated ZnS and/or $BaSO_4$, $ZrO_2$, $Al_2O_3$ or other (ceramic) materials precipitated out of aqueous solution. Initial examples of the granulation of powder or dust which may be cited are as follows: granulation of pigments, fillers, ceramic and pyrogenic powders, ZnO, MgO, soot, coal dust, filter dust, wheel swarf, foundry dust, masonry dust, metal dust, and ash.

Thus, the method of the invention is directed towards the use of particulate materials which occur in industrial processes and their transformation into granulates, as well as to their use. The particulate material used in accordance with the invention from industrial processes does not contain residues from methods which include a step for the biological treatment of domestic or industrial waste water, or from methods which include a biological process step, for example using microorganisms, and thus do not contain any fermentation residues from biogas plants, residues from the manufacture of foodstuffs as brewing sludge, must, wine or liquors, residues from agriculture or residues from the purification of domestic waste water or industrial waste water.

In this regard, the particulate material of the invention may contain or consist of inorganic or organic pigments, preferably titanium dioxide pigments, iron oxide pigments, chromium oxide pigments or carbon black, residues from titanium dioxide production, in particular from the sulphate process or the chloride process, iron sulphate heptahydrate, green vitriol, concrete grinding sludge, grinding residues, grinding sludge, paint sludge, fillers, kaolin, $CaCO_3$, $BaSO_4$, ZnS, lithopone, plaster of Paris, phosphating sludge, solvent residues, gangue, neutralization sludges, foundry sludges, residues from the galvanizing industry and from thickeners, metal sludges, metal hydroxide sludges or metal hydroxide-containing sludges, drilling sludges, ceramic intermediates such as zirconium hydroxide, aluminium hydroxide, aluminium titanate, zirconium titanium hydrate, for example, sludges from natural gas production and purification or mixtures thereof. In this regard, the particulate material preferably has a neutral pH or has a pH around neutral from a pH of 5 to 9, and any water soluble salts which might be present are preferably washed out of the particulate material.

In particular, the present invention is directed towards the granulation of particulate material from industrial processes which contains or consists of inorganic or organic pigments, preferably titanium dioxide pigments, iron oxide pigments, chromium oxide pigments or carbon black, residues from titanium dioxide production, in particular from the sulphate process or the chloride process, iron sulphate heptahydrate, green vitriol, $BaSO_4$, ZnS, lithopone, zirconium hydroxide, aluminium hydroxide, aluminium titanate, zirconium titanium hydrate, or mixtures thereof.

Preferably, the method is characterized in that granulates with a mean diameter of 0.1 to 20 mm, preferably 0.5 to 10 mm, particularly preferably 1 to 5 mm can be produced in this manner. In order to determine the granulate diameter, the smallest identifiable microstructure of the material is taken as the basis. The method is further preferably characterized in that the residual moisture content of the granulates obtained is 40% to 90% by weight, preferably 50% to 85% by weight, particularly preferably 70% to 85% by weight. These values refer to the residual moisture content immediately after manufacture when the granulates leave the granulating equipment, since the granulates can rapidly release moisture to the air.

The granulates obtained form a non-sticky, transportable, in particular pneumatically conveyable bulk material which does not have a tendency to cake. The granulates do not stick to each other or to the walls of the containers. At low additive contents, the individual granulates might indeed adhere to each other; however, this adhesion is not permanent and the granulates fall apart again readily. Structures which temporarily form during storage under pressure (snowballs) collapse back into the original granulates as soon as they are placed under even mild shear.

The morphology and particle size of the granulates thus depends on the type and quantity of the additive or additives and on the type and intensity of the mixing or mixing equipment. The composition of the moist materials as well as the particle size of the additive may also have an influence. Preferably, by judicious selection of the type and quantity of the additives, a suitable granulate size is obtained. These interrelationships can be determined for the respective composition of the moist materials in question by simple routine mixing tests. The mantra here is: the higher the quantity, the finer will be the granulate particles obtained.

Any mixer, stirrer, kneader or like device which can produce a sufficiently high homogeneity of the mixed material in a reasonable period may be used as the mixing equipment. Advantageous equipment in this regard is equipment with fast-running mixing tools. However, kneaders are in general suitable. Typical mixing times for the formation of the granulates of the invention for equipment with fast-running mixing tools is approximately one to three minutes. In this regard, all of the components can either be added to the mixing equipment one after the other, or all together. Mixing may be carried out continuously or discontinuously.

It is also possible that in order to increase the stability of the granulates, an additional 0.1% to 20% by weight, preferably 0.1% to 5% by weight, particularly preferably 0.1% to 3% by weight of materials which can chemically bind water or moisture, preferably cement, in particular cement with a setting time of less than one hour, quick lime, fly ash, anhydride or salts which can be transformed into a form having more crystal water, can be added. In this manner, the granulates obtained can be mechanically stabilized and their storage and transport properties can be further improved.

In accordance with the invention, the term "moisture or water-absorbing organic polymeric materials" is primarily assumed to mean so-called "superabsorbents". The term "superabsorbent" as used in the context of the present invention means those polymers which can take up multiples of its own weight—up to 1000 times—of water or other liquids by swelling and can retain the absorbed amount of liquid, even under a certain pressure. Superabsorbents can be of natural or synthetic origin. DE 202011002784 provides examples of natural superabsorbents, potato starch or polysaccharides of general types, which may be of application to the invention.

As a rule, a chemical superabsorbent is a so-called basic polymer, in particular a copolymer of acrylic acid (propenoic acid, $C_3H_4O_2$) and sodium acrylate (sodium salt of acrylic acid; $NaO_2C_3H_3$), wherein the ratio of the two monomers with respect to each other can be varied. In addition, a so-called core cross-linker is added to the monomer solution, which binds together (cross-links) the long chain polymer molecules which are formed at various locations by means of chemical bridges. These bridges mean that the polymer becomes insoluble in water. The lack of solubility caused by the three-dimensional cross-linking is an essential feature of the superabsorbents or hydrogels used in accordance with the invention. These materials differ from chemically very similar flocculants or flocculating agents in their insolubility in water. When liquid or moisture penetrates a polymer particle, it swells and tightens this network on a molecular level so that the liquid or moisture is bound.

As a rule, superabsorbents are small, pulverulent particles with diameters on the nanometer scale up to several hundred micrometers, but they may also have dimensions in the millimeter region. In general, synthetic superabsorbents are produced in which partially neutralized acrylic acids are polymerized in aqueous solution in the presence of multifunctional cross-linking agents by means of a radical reaction to form a gel which is dried, ground and classified into the desired particle size.

Methods of this type for the manufacture of "superabsorbents" are well known in the art. Examples in this regard which can be cited are U.S. Pat. No. 4,286,082, DE 2706135, U.S. Pat. No. 4,076,663, U.S. Pat. No. 4,340,706, DE 3713601, DE 2840010, DE 10130427, DE 4020780, DE 10161496 and DE 102005021221.

Superabsorbents are also known which are formed from natural compounds with synthetic materials or monomers. Examples of such products have been described by R. Dhodapkar, N. N. Rao, S. P. Pande, S. N. Kaul, Biosource Technology, 97 (2006) 887-885 and R. Dhodapkar, N. N. Rao, S. P. Pande, T. Nandy, S. Devotta, Reactive and Functional Polymers, 67 (2007) 540-548. These superabsorbents are more environmentally friendly than purely synthetic products for similar properties, and as a rule are more biologically degradable.

Further, it is known that superabsorbents as used in the context of the present invention can be produced from polymeric beads which are increasingly cross-linked from the interior outwards (Ullmanns Encyclopaedia of Industrial Chemistry, 6th. Edition, Vol. 35 pp 73, 2003 and DE 202005020566). The advantage of this cross-linking gradient (core-shell structure) is that the beads mentioned retain moisture better when under mechanical load (pressure).

Furthermore, hybrid materials consisting of polymeric superabsorbents in combination with organic and/or inorganic hollow beads are known (DE 102009016404). The advantage of a combination with hollow beads is that the superabsorbent hybrid materials absorb moisture faster than the polymeric superabsorbents alone, without substantially reducing the water uptake capacity. Thus, such materials comprising hollow beads also constitute a superabsorbent or a moisture-absorbing organic polymeric material in the context of the present invention.

Many other superabsorbing substances are known which are formed from a mixture of polymeric superabsorbents and ground mineral additives (DE 202006020295, DE 102005021221, DE 102009034137, DE 202007016362, DE 202011002784, DE 202011003679, WO 2006/119828). The mineral additives may either have their own water uptake action (for example bentonite) or act indirectly, in that they improve the through-flow behavior of the superabsorbent for liquids and thus can have a positive influence on the rate of binding the moisture. A combination of absorbent polymers, mineral additives and alginate formed from sea algae, especially brown algae, is also known (DE 29516675).

Further, in superabsorbent technology a distinction is made between superabsorbents and hydrogels. While the term "superabsorbent" is understood to mean the nearly dry, water-absorbing substances, "hydrogels" are superabsorbents which are already wholly or partially swollen. Thus, superabsorbent particles may contain particles of superabsorbent polymer in the dry state, in particular particles which either contain practically no water or up to approximately 10% by weight of water, as disclosed in DE 602004002202. The terms "superabsorbent gel", "superabsorbent hydrogel" then refer to a superabsorbent polymer with a water content of at least approximately 10% by weight, typically particles which have absorbed at least their own weight, and typically a multiple of their own weight of water.

The term "hydrogel" as used in the context of the present invention primarily means a polymer which absorbs liquid or moisture and then retains it, but is insoluble in water, the molecules of which are chemically, for example by covalent or ionic bonds, or physically, for example by entanglement of the polymer chains, linked into a three-dimensional network. By means of integrated hydrophilic polymer components, the polymer chains swell in liquid (water, acid, salty solution) or under the influence of moisture, substantial increasing in volume without losing their cohesion.

The use of pre-swollen superabsorbent gels or hydrogels or superabsorbent hydrogels—these are all descriptions of the same state—can nevertheless be of advantage in accordance with the invention, because hydrogels which are not yet saturated with liquid can in some cases take up more liquid more rapidly. In accordance with the invention, any of the organic polymeric materials cited above may be used, and thus the present invention also encompasses the use of hydrogels for the granulation of moist materials.

In "European Disposables and Nonwovens Association", Avenue Eugene Plasky, 157-1030 Brussels, Belgium (EDNA) there is a document "EDNA Recommended Test Methods" (abbr: ERT) from 2002 which, inter alia, describes three methods which characterize swelling behavior. These are:

"Free Swell Capacity" (FSC) ERT 440.2-02,
Centrifuge Retention Capacity, (CRC) ERT 441.2-02,
Absorption under Pressure, (AUP) ERT 442.2-02.

Any of the materials cited above constitute moisture-absorbing organic polymeric materials within the meaning of the present invention. In particular, a "moisture-absorbing organic polymeric material" means any superabsorbent or superabsorbing composition which contains superabsorbents or hydrogels, which are characterized in that they have a free swell capacity (FSC) of at least 4 g/g, preferably 10 g/g and particularly preferably more than 30 g/g in accordance with EDNA ERT 440.2-02 (or ISO 17190-5:2001).

Preferably, the moisture-absorbing organic polymeric materials contain polymerisates of acrylic acid, preferably a copolymer formed from sodium acrylate and acrylamide, or are formed therefrom. The superabsorbents or hydrogels cited above or substances or materials containing them thus constitute part of the subject matter of the invention. Particularly advantageously, because of their high water-binding potential, the superabsorbents or hydrogels are only required in small quantities. In this manner, the total mass of the material to be granulated is only negligibly increased and the expenditure for mixing, packaging, storage and transportation is kept within reasonable limits.

It has been shown that the superabsorbents only have to absorb a small amount of the water present in order to make a substantial difference to the consistency of the material to be granulated (suspension, sludge, filter cake or paste). Because of the small quantity of superabsorbent which is added, the residual moisture of the granulates obtained is generally hardly altered compared with the situation before adding the superabsorbent. Thus, the use of superabsorbents or hydrogels means that stable and easy-to-handle granulates are obtained which generally have a very high water content.

The quantity of moisture or water-absorbing swellable organic polymeric materials added may be 0.01% to 10% by weight, preferably 0.1% to 5% by weight, particularly preferably 0.8% to 3.5% by weight, with respect to the total weight of the particulate material.

As examples, Luquasorb 1161 from BASF or Favor from Evonik may be used. For the same dose or process, somewhat finer granulates can be obtained with Luquasorb 1161.

Furthermore, the granulates may have a weight ratio of water to organic polymer of 5 to 1000, preferably 10 to 200, in particular 25 to 100.

In addition, the granulates may have a weight ratio of water to carbon, in particular in organic compounds, of 10 to 2000, preferably 20 to 400, in particular 50 to 200.

Furthermore, the granulates in the embodiment of the invention can also be characterized in that it has a ratio of loss on ignition (as a % by weight) to carbon (as a % by weight) of 10 to 2000, preferably 20 to 400, in particular 50 to 200.

In particular, the granulates are advantageously provided such that they can be conveyed pneumatically.

Further, the granulates are characterized in that they have a bulk density of less than 1.6 $g/cm^3$, preferably less than 1.2 $g/cm^3$, particularly preferably less than 1.0 $g/cm^3$, and/or a tapped density (1000 taps in the tapped volume test instrument in accordance with DIN 53194) of less than 1.7 $g/cm^3$, preferably less than 1.5 $g/cm^3$, particularly preferably less than 1.4 $g/cm^3$.

The granulates are advantageously further characterized in that the percentage of granulates with a particle size between 1 and 5 mm is at least 50%, preferably at least 70%, in particular at least 80% of the total weight. This percentage is determined by counting (under an optical microscope), assuming a constant density and a spherical shape for the individual particles.

It is also possible to use a combination of a superabsorbent and a finely divided, pulverulent material to granulate moist materials, provided that the finely divided pulverulent material does not have a deleterious effect on subsequent use. In this manner, the amount of superabsorbent required to produce suitable granulates can be reduced. As an example, in order to form pigment granulates, in addition to the superabsorbent, additional fillers may be added to a pigment preparation containing moisture.

In a further embodiment of the invention, however, it is also possible that no further additives are added to the material to be granulated apart from the superabsorbent or hydrogel.

It is also possible to use so-called off-spec goods as the superabsorbent or hydrogel, i.e. materials which have been manufactured incorrectly or handled incorrectly. Because of the high quality requirements for materials which can come into contact with the human body, on occasion, superabsorbents or hydrogels which are intended for hygiene applications are not (or are no longer) suitable, for example due to microbiological contamination, but there is no problem with using these products for granulation. In this manner, the method of the invention constitutes a practical and economically attractive potential use for such off-spec goods.

Preferably, the material to be granulated can be mechanically dewatered prior to adding the superabsorbent, for example by means of a filter press, a centrifuge or a dewatering screw. In this regard, preferably, a dry matter content of 10% to 80% by weight, preferably 15% to 60% by weight, particularly preferably 20% to 35% by weight can be obtained. Following mechanical dewatering, the material to be granulated is preferably in the form of lumps or as a paste and is then mixed with the superabsorbent and transformed into a granulate. Mixing may be continuous or discontinuous. A continuous mixing is better for preventing initial caking. Mechanical dewatering is advantageous since in this manner, only comparatively small quantities of additives are required in order to form the granulates of the invention.

The granulates obtained in accordance with the invention have good storage and transport properties and can be packed into containers as bulk material and then removed from them again. In particular, the granulates are characterized in that they can be conveyed pneumatically.

In a preferred embodiment of the invention, after granulation, the moisture content of the granulates obtained is reduced by contact with a gaseous medium, preferably using fluidized bed or moving bed drying, and/or by supplying thermal energy. The granulates can be dried by passing a gaseous medium, for example air, through the granulates or over the granulates. Because of the substantially increased surface area of the granulates compared with the liquid, pasty or lumpy starting material, drying is very rapid.

Compared with a lumpy material with an assumed mean diameter of 20 cm (a not untypical value for filter cake from a filter press), the geometric surface area of granulates with a diameter of 10 mm is a factor of 20 higher; for a diameter of 1 mm, the surface area enlargement factor is 200, and for a diameter of 0.1 mm, the surface area enlargement factor is 2000.

In addition, the period the water needs to reach the surface of a particle from its interior is much shorter for smaller particles than with larger particles. This period can be the rate-determining step for drying if the gas exchange on the surface of the particle is good.

Air, preferably air heated to a temperature of less than 70° C., particularly preferably to a temperature of 40° C. to 60° C., can be used as the gaseous medium. Particularly preferably, the moisture content of the granulates obtained after mixing can be dried with a gas which contains waste heat which is otherwise not usable. In this manner, waste heat from an industrial combustion process which can no longer be used for the production of electricity or steam can be used.

Because of the large geometric surface area of the granulate particle, drying may be carried out with air at a temperature of less than 50° C., preferably less than 40° C., particularly preferably less than 30° C. This has the advantage that the energy costs for drying are very low or even zero.

Because of the good storage and transport capability of the granulates, they can also readily be brought to a site where waste heat is available. Storage in silos or transport in silo wagons is also made possible. Furthermore, it is possible to carry out drying of the granulates in the silo wagon by passing air through the silo.

In one embodiment of the invention, the granulates obtained are in the form of a bulk material in a bulk material container, preferably a silo, through which gas is passed, particularly preferably from bottom to top. The speed of the gas is preferably selected such that the granulates obtained are in the form of a solid bed and do not move on a macroscopic scale.

Alternatively, the granulates obtained may be in the form of bulk material which has been spread out flat, wherein the thickness of the bulk material is less than 0.5 m, preferably less than 0.3 m, particularly preferably less than 0.1 m. In this manner, because of the high geometric surface area of the granulate particles, effective drying is obtained without the need for an expensive mechanical process for turning the granulated bulk material. The drying effect may be speeded up further by flushing the granulates through with a stream of gas, preferably produced using fans.

When supplying thermal energy, drying is favoured by using the granulate form, in particular in equipment which mechanically treats the material to be dried such that "fresh" surface is produced. Drying units which operate using the principle of contact drying, for example drum, tumble, plate, screw or paddle dryers, are particularly preferred.

It is also possible not to supply ready-prepared granulates to the dryer, and to produce or finish the granulates in the dryer by mixing the moisture-absorbing organic polymeric materials, in particular superabsorbents and/or hydrogels together with the substance to be dried in the drying unit by mechanical action. In this regard, it is possible to introduce the components into the drying unit either together or spatially and/or temporally separated. Producing granulates in the drying unit by adding a superabsorbent or hydrogel is particularly advantageous when the material to be dried has a tendency to cake or exhibits thixotropic behavior.

The method of the invention is particularly advantageous when highly abrasive materials have to be dried. Forming granulates means that the abrasive effect of such materials is substantially reduced. This is, for example, due to the fact that granulates in a drum dryer primarily move in a rolling movement rather than a grinding movement. In addition, because of the granular structure with its large geometric surface area, it is possible that the drying process does not create new surfaces, so that the application of shear forces and the accompanying abrasive effect can be largely dispensed with. The use of a drum dryer is of particular advantage when using abrasive materials. Because of the advantageous surface area-volume ratio of a drum dryer, the fraction of the particles of granulate which comes into contact with the wall of the dryer is relatively small.

The method of the invention is also of particular advantage with materials to be dried which have a tendency to segregate, for example when spray drying. The granular structure means that the composition is "fixed" and in addition, drying is carried out over a longer period, so that segregation can be avoided.

Because of the good rheological properties of the granulates, both for drying and also for a subsequent thermal processing step (for example calcining), improved homogeneity and increased throughput are obtained since the good rheological properties of the granulates provide that all granulates have optimal contact with the gas phase or the drying gas on all sides. Thus, granulation can increase the throughput during drying or heat treatment.

The method of the invention is also of advantage when using materials to be dried which cannot withstand high temperatures. The granular structure means that gentle drying at ambient temperature is made possible. Preferably, the moisture content of the granulates to be dried is less than 30% by weight, preferably 5% to 25% by weight, particularly preferably 10% to 20% by weight.

The moisture content or the moisture or residual moisture (all these terms are used synonymously here) corresponds to the weight loss which occurs at 105° C. in a drying cabinet to constant weight. Constant weight is considered to have been reached when the weight change between 30 minute weighing intervals is less than 0.1% absolute. The dry matter content (or solids content) as a % corresponds to 100% minus the residual moisture (as a %).

The loss on ignition of the preparation can be 10-60% by weight, preferably 20-45% by weight, in particular 25-40% by weight. The loss on ignition corresponds to the weight loss which occurs after 1 hour at 1000° C. in a muffle furnace.

The invention also pertains to granulates which can be produced in accordance with one of the claimed methods.

Preferably, the granulates have a mean diameter of 0.1 to 20 mm, preferably 0.5 to 10 mm, particularly preferably 1 to 5 mm.

The dry matter content of the granulates without the downstream drying step is preferably 10% to 60% by weight, preferably 15% to 50% by weight, particularly preferably 15% to 30% by weight.

Preferably, the volume fraction of the voids in the granulate bulk material is 2% to 35% by volume, preferably 5% to 25% by volume, particularly preferably 10% to 20% by volume. The optimal granulate size is dictated by the intended application.

When the granulates obtained are to be dried, a granulate is advantageously produced which on the one hand has as high a geometric surface area as possible, but on the other hand is not blown away by the gas stream used for drying. Preferably, then, granulates with a mean diameter (volumetric mean) of 0.1 to 20 mm, preferably 0.5 to 10 mm, particularly preferably 1 to 5 mm are produced. The granulate size and mass fraction are determined by counting (using an optical microscope), assuming a constant density and spherical shape for the individual particles.

Normally, the higher the selected quantity of additive or additives, the finer will be the granulate particles. When sufficient time and space is available for drying, the granulates can also have a mean diameter of more than 5 mm, but when the drying process has to be carried out very efficiently, smaller granulates can be obtained. The costs for the method are correspondingly higher for fine granulates because of the cost of the additives.

When dust formation on drying has to be kept as low as possible, the intention is to obtain larger granulates.

In each case, it is advantageous to obtain a bulk material of granulates which has as high a void volume as possible and as low a flow resistance as possible for the gas used for drying. This is preferably accomplished by not using any granulates which are too fine and by using a substantially uniform granulate size. Preferably, the bulk material thickness of the (not dried) granulated bulk material is at least 10%, particularly preferably more than 20% less than the density of the material to be granulated before adding the additives.

Particularly preferably, granulates with a mean dimension of 0.5 to 10 mm, in particular 1 to 5 mm are manufactured, with subsequent drying, whereby the mechanical load on the granulates is only small. In this manner, dust removal on drying can be completely dispensed with, or a simple and inexpensive method for dust removal can be selected (for example a cyclone or wet scrubber).

Particularly preferably, moving bed drying is carried out, as this results on the one hand in good mixing of the granulates and on the other hand in low dust formation by cooperation of the gas flow and mechanical action (for example vibration).

Advantageously, when forming granulates, in particular pigment granulates, in addition to the superabsorbent or hydrogel, additional dispersing agents or binders are added in order to adjust the dispersibility or stability of the granulates obtained.

It is also possible for the granulates to contain a hydraulic binding additive, in particular a binder. As an example, the granulates may contain cement, in particular cement with a setting time of less than 1 hour.

Alternatively, a heat treatment of the granulates obtained with the addition of superabsorbents can decompose the superabsorbent and produce granulates which are free from organic compounds and which can be dispersed more easily.

The present invention is of particular application to the manufacture of preparations and granulates using residues from titanium dioxide manufacture.

Thus, preferably, the invention is directed towards a preparation or a granulate containing a $TiO_2$ residue from titanium dioxide manufacture as well as a water-absorbing, water-insoluble and swellable organic polymeric material as a superabsorbent.

The $TiO_2$ residue is advantageously a digestion residue obtained by carrying out titanium dioxide manufacture using the sulphate process, or it comprises said residue. In addition, the preparation may be characterized in that the $TiO_2$ residue is a residue obtained by carrying out titanium dioxide manufacture using the chloride process, preferably from the chlorination reactor, which in particular undergoes a further preparation step, or contains said residue. As an example, the preparation step may be a neutralization and/or washing to remove water soluble compounds.

This organic polymeric material, when (ad)mixed with the $TiO_2$ residue or the $TiO_2$ residues, absorbs at least a portion of the moisture contained therein so that a preparation or mixture or granulate is obtained wherein the moisture initially in the $TiO_2$ residue or in the $TiO_2$ residues or the water present is now at least partially bound in the moisture-absorbing and/or moisture-binding, in particular water-binding material, in particular in that organic component or organic components. In this manner, a non-sticky, transportable, in particular pneumatically conveyable preparation which does not tend to cake, or a bulk material of this type is obtained.

Thus, for example, when using 0.6% by weight of Luquasorb 1161 from BASF, it is possible to obtain approximately 1 to 2 mm sized granulates. By increasing the quantity of additive, finely divided granulates may also be produced. By adding suitable binders (for example a finely divided titanium oxide hydrate with a BET specific surface area of more than 200 g/cm$^3$ or a titanyl sulphate solution or cement), the stability of these granulates, in particular after heat treatment, can be increased so that the granulates are particularly suitable for use in fluidized bed furnaces, both as regards particle size and also as regards stability.

In this manner, granulates may be produced which, after drying and/or calcining, have a mean particle size of 100 to 900 μm, preferably 150 to 600 μm, particularly preferably 200 to 400 μm.

Preferably, the binder, in particular cement, is added after adding the water-binding materials and forming the granulates, since in this manner, setting and hardening of the whole mass is avoided.

Particularly when the preparation of the invention is processed further or used further down the line and the presence of moisture or water is not critical, an expensive, logistically complicated, separate or additional drying of the $TiO_2$ residue or digestion residue can be dispensed with under certain circumstances.

In summary, the invention exhibits the advantages of transforming $TiO_2$ residues into a form which is easy to handle by using the water-binding material, so that transport as bulk material or pneumatic conveying is also made possible. A drying step is not vital.

Particularly advantageously, only a small amount of the water-binding material is necessary. In this manner, the total quantity is only negligibly increased, and the costs of mixing, packaging, storage and transport are kept within reasonable limits.

The mixture or preparation obtained can readily be stored and transported.

The preparation which is obtained has multiple uses, applications or further processing opportunities. In particular, the preparation is suitable for use in metallurgical processes, for the manufacture of refractories, as a titanium-containing additive for welding applications or for the manufacture of titanium-containing coatings for welding electrodes or for the manufacture of flux or as a catalyst or photocatalyst or for the manufacture of catalysts or photocatalysts, for the manufacture of heavy metal adsorbents, for the manufacture of landfill covering or as a construction material, as envisaged in the embodiments of the invention.

After drying and optional grinding, the preparation can advantageously be used for applications as fillers for rubber, thermoplastics or synthetics, or as an asphalt filler.

After calcining the preparation, possible applications are as an abrasive, in particular for water jet cutting, or as a titanium-containing raw material for the manufacture of titanium dioxide using the chloride process or for the manufacture of titanium tetrachloride.

Preferably, the preparation of the invention contains the following materials as principal components (all inorganic components expressed as the oxide; details are given as the % by weight with respect to the total mass of the preparation):

| | |
|---|---|
| $TiO_2$: | 25 to 60 |
| $SiO_2$: | 5 to 25 |
| $Fe_2O_3$: | 2 to 12 |
| MgO: | 0.1 to 4 |
| CaO: | 0.4 to 12 |
| $H_2O$: | 15 to 45 |
| Organic polymer: | 0.5 to 1.0 |
| (in the form of a superabsorbent) | |
| (or organic carbon | 0.2 to 0.5) |

The fraction of $TiO_2$ residue from titanium dioxide manufacture in the solid fraction of the preparation may be 1% to 99.9% by weight, preferably 50% to 99.5% by weight, in particular 90% to 99.5% by weight.

The moisture content of the preparation may be 10-50% by weight, preferably 15-40% by weight, in particular 20-30% by weight.

Preferably, the preparation has a $TiO_2$ content of 25% to 60% by weight, preferably 30% to 50% by weight, a $SiO_2$ content of 5% to 25% by weight, particularly preferably 8% to 20% by weight.

The sulphate content of the preparation may be <3.0% by weight, preferably <1.0% by weight, in particular <0.5% by weight.

Shaped articles can readily be produced from a preparation manufactured or obtained in accordance with the invention. In this regard, known shaping processes such as agglomeration, pelletization, granulation, extrusion as well as compressing, sintering, briquetting or coking are possible.

In summary, the invention has the advantage that simply by adding an additive in the form of moisture-absorbing organic polymeric materials, preferably a superabsorbent and/or hydrogel, moist materials can be transformed into a granulate and thus into a form that can readily be handled, so that storage or transport as bulk material or pneumatic conveying is made substantially easier. In addition, the granular structure allows for substantially easier evaporation or vaporization of the moisture, and thus for efficient drying of the granulates, which in the prior art was only possible with expensive mechanical assistance and/or the additional supply of thermal energy.

The invention will now be explained in more detail with the aid of the following examples:

Example 1

482 g of digestion residue filter cake which was obtained from digestion during $TiO_2$ production using the sulphate process with a solids content of 62% by weight and a $TiO_2$ fraction of 75% by weight (with respect to the solids content) was mixed together with 3.0 g of a superabsorbent (type: Luquasorb 1161 from BASF) in a domestic Krups-3-mix mixer for 15 minutes. The preparation obtained had a granular structure with a gel-like consistency, but was not sticky and could be stored and conveyed very easily.

Over 90% by weight of the product obtained had a particle size in the range 1 to 5 mm (determined by counting 200 particles and calculating the mean). The bulk material density was 0.95 g/cm$^3$ and the tapped density (1000 taps in the apparent volume test instrument in accordance with DIN 53194) was 1.32 g/cm$^3$. The granular preparation poured out of a filled 500 ml measuring cylinder with a diameter of 50 mm almost in its entirety after turning it through 180° (only a few remaining crumbs remained on the cylinder wall and floor).

When the product obtained was spread out into a thin layer at ambient temperature, after 1 hour it lost approximately 8%, after 2 h approximately 14% of its weight and after 8 h approximately 33% of its weight, i.e. nearly its entire water content.

The still moist, water-containing granulate provided with the water-binding material, preferably with a granulometry of 1-5 mm, could also be used as a material for landfill covering or for the production of coatings for welding electrodes.

Example 2

Comparative Example

Digestion residue filter cake obtained from digestion during the production of $TiO_2$ using the sulphate process and with a solids content of 68% by weight with a $TiO_2$ percentage of 75% by weight (with respect to the solids content) was placed in a 500 ml measuring cylinder with a diameter of 50 mm. Upon turning it through 180°, a large proportion (>90% by weight) of the digestion residue filter cake stayed stuck in the cylinder.

In order to determine the tapped density, the digestion residue filter cake was comminuted into pieces approximately 1 cm$^3$ in size. The tapped density (1000 taps in the apparent volume test instrument according to DIN 53194) of the digestion filter cake was 1.84 g/cm$^3$.

Example 3

Granulation of Iron Oxide 1 kg of an iron oxide yellow pigment (FeOOH×$H_2O$) in the form of a filter cake with a 35% solids content was mixed together with 20 g of a superabsorbent (type: Luquasorb 1161 from BASF) in a ploughshare mixer for 5 minutes. A granulate was obtained which stored well and was easily conveyable and had a diameter in the range 0.5 to 2 mm.

Example 4

Granulation and Drying $TiO_2$ Pigment 500 g of a reprocessed titanium dioxide pigment in the form of a filter cake with a 70% solids content was kneaded for 10 minutes together with 10 g of a superabsorbent (type: Luquasorb 1161 from BASF) using a domestic Krups-3-mix mixer. A granulate was obtained which stored well and was easily conveyable and had a diameter in the range 0.5 to 3 mm.

Example 5

Granulation of Finely Divided Neutralized Titanium Hydrate 566.8 g of titanium hydrate (metatitanic acid), which appears during $TiO_2$ production using the sulphate process and is obtained by hydrolysis of acidic (sulphuric) titanyl sulphate solution, was neutralized with NaOH and washed. The filter cake obtained, with a solids content of 44.1% (corresponding to 250 g of dry matter) was kneaded with the slow and continuous addition of 2.5 g of a superabsorbent (type: Luquasorb 1161 from BASF) using a domestic Krups-3-mix mixer on the lowest setting for 1 hour. The preparation obtained (solids content 46.2%) had a granular structure with a diameter in the range 1 to 3 mm and stored well and was easily conveyable. After drying for 72 hours in a circulated air drying cabinet at ~34° C., the granulates had a residual moisture content of 13%.

The present invention is not limited to embodiments described herein; reference should be had to the appended claims.

What is claimed is:

1. A method for granulating a particle-containing material from an industrial process, the method comprising:
   mixing the particle-containing material in the presence of water with a material that consists of or comprises a water-absorbing and swellable organic polymer compound which is insoluble in water so as to obtain granulates.

2. The method as recited in claim 1, wherein
   the water is humidity adhering to the particle-containing material; and/or
   the water is added to the particle-containing material or to a blend of the particle-containing material and the material that consists of or comprises a water-absorbing and swellable organic polymer compound which is insoluble in water.

3. The method as recited in claim 1, wherein the particle-containing material has a humidity of 20 to 85 wt.-%, based on a weight of the particle-containing material.

4. The method as recited in claim 1, wherein the particle-containing material is provided as a slurry, a sludge, a paste, a filter cake, or as a salt comprising crystal water, or the particle-containing material comprises at least one of the slurry, the sludge, the paste, the filter cake, and the salt comprising crystal water.

5. The method as recited in claim 1, wherein the particle-containing material is provided as a dry powder, a dust, or as a mixture of the dry powder and the dust.

6. The method as recited in claim 5, wherein the method further comprises:
   blending the dry powder, the dust, or the mixture of the dry powder and the dust with the material that consists of or comprises a water-absorbing and swellable organic polymer compound that is insoluble in water; and then
   adding water and/or the particle-containing material comprising water.

7. The method as recited in claim 1, where the water-absorbing and swellable organic polymer compound is at least one of a superabsorbent and a hydrogel.

8. The method as recited in claim 7, wherein the at least one of a superabsorbent and a hydrogel is or comprises a polymerizate of acrylic acid.

9. The method as recited in claim 1, wherein the water-absorbing and swellable organic polymer compound that is insoluble in water is provided in an amount of 0.1 to 5% based on the weight of a particle-containing material comprising humidity.

10. The method as recited in claim 1, wherein the water-absorbing and swellable organic polymer compound that is insoluble in water is provided in an amount of 0.8 to 3.5% based on a weight of a particle-containing material comprising humidity.

11. The method as recited in claim 1, further comprising drying the granulates, wherein the drying is performed in a fluidized-bed dryer by contacting the granulates with a gaseous media so as to lower a humidity.

12. The method as recited in claim 1, further comprising calcining the granulates.

13. Granulates comprising:
   a particle-containing material from an industrial process;
   a water-absorbing and swellable organic polymer compound that is insoluble in water; and
   water of more than 5 wt.-% based on a total weight of the granulates
   wherein, the water-absorbing and swellable organic polymer compound that is insoluble in water is a polymerizate of acrylic acid.

14. The granulates as recited in claim 13, wherein the granulates comprise water of from 20 to 85 wt.-% based on a total weight of the granulates.

15. The granulates as recited in claim 13, wherein the granulates have a dry weight ratio of the water-absorbing and swellable organic polymer compound that is insoluble in water to the particle-containing material of 0.015 to 0.08.

16. The granulates as recited in claim 13, wherein the granulates have a mean particle diameter of 1 to 5 mm.

17. The granulates as recited in claim 13, wherein a proportion of the granulates with a particle diameter of between 1 and 5 mm is at least 50 wt.-% based on a total mass of the granulates.

18. The granulates as recited in claim 13, wherein the particle-containing material consists of or comprises inorganic pigments, organic pigments, residues from titanium dioxide production, ferrous sulfate heptahydrate, copperas, concrete polishing sludge, polishing residues, polishing sludges, paint sludges, varnish sludges, fillers, china clay, $CaCO_3$, $BaSO_4$, ZnS, lithopone, gypsum, phosphate sludge, residues from solvents, gangue, sludges from neutralization, foundry sludges, residues from galvanic processes, residues from thickeners, metal sludges, metal hydroxide sludges, sludges comprising metal hydroxides, drilling muds, ceramic intermediate products, aluminum titanate, aluminum hydroxide, zirconium titanium hydrate, sludges from natural gas production, sludges from natural gas purification, and mixtures or blends thereof.

* * * * *